(12) United States Patent
Ashizawa (10) Patent No.: US 8,387,588 B2
(45) Date of Patent: Mar. 5, 2013

(54) CONTROL APPARATUS AND CONTROL METHOD FOR DIRECT INJECTION SPARK IGNITION INTERNAL COMBUSTION ENGINE

(75) Inventor: Takeshi Ashizawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1085 days.

(21) Appl. No.: 12/374,178

(22) PCT Filed: Jul. 19, 2007

(86) PCT No.: PCT/IB2007/002043
§ 371 (c)(1),
(2), (4) Date: Jan. 16, 2009

(87) PCT Pub. No.: WO2008/012626
PCT Pub. Date: Jan. 31, 2008

(65) Prior Publication Data
US 2010/0012081 A1  Jan. 21, 2010

(30) Foreign Application Priority Data

Jul. 20, 2006 (JP) .................................. 2006-198295
Jul. 27, 2006 (JP) .................................. 2006-204613

(51) Int. Cl.
*F02B 31/00* (2006.01)
*F02M 43/00* (2006.01)

(52) U.S. Cl. ........ 123/301; 123/304; 123/305; 123/306; 123/457; 700/103

(58) Field of Classification Search ............... 123/301, 123/306, 304, 305, 457, 458; 701/103, 104, 701/105

See application file for complete search history.

(56) References Cited

U.S. PATENT DOCUMENTS

| 4,404,944 A | * | 9/1983 | Yamazaki et al. ............ 123/458 |
| 4,481,908 A | | 11/1984 | Iida |
| 4,499,861 A | * | 2/1985 | Wiegand et al. .............. 123/1 A |
| 4,522,173 A | * | 6/1985 | Agache .......................... 123/276 |
| 4,553,504 A | * | 11/1985 | Duggal et al. ................ 123/25 J |

(Continued)

FOREIGN PATENT DOCUMENTS

| JP | 2-61326 | 3/1990 |
| JP | 2-305335 | 12/1990 |

(Continued)

OTHER PUBLICATIONS

Office Action issued Jan. 14, 2011, in Korean Patent Application No. 2009-7001119 with English translation.

*Primary Examiner* — Mahmoud Gimie
*Assistant Examiner* — David Hamaoui
(74) *Attorney, Agent, or Firm* — Oblon, Spivak, McClelland, Maier & Neustadt, L.L.P.

(57) ABSTRACT

An ECU controls an internal combustion engine that creates a tumble flow in each engine cylinder and intensifies the tumble flow using fuel injected at a timing near the intake stroke bottom dead center during homogeneous combustion. The ECU includes a fuel property identifying mechanism identifying the property of fuel and combustion state changing mechanism changing the combustion state. When the fuel has a property that requires a stoichiometric air-fuel ratio lower than the stoichiometric air-fuel ratio for gasoline, the combustion state changing mechanism changes the combustion state by, for example, retarding the ignition timing, so that the combustion progresses moderately. This prevents an excessive increase in the combustion speed.

10 Claims, 8 Drawing Sheets

U.S. PATENT DOCUMENTS

| | | | | |
|---|---|---|---|---|
| 4,993,391 A * | 2/1991 | Kuribara et al. | | 123/482 |
| 4,998,518 A * | 3/1991 | Mitsumoto | | 123/306 |
| 5,188,087 A | 2/1993 | Saito | | |
| 5,190,001 A * | 3/1993 | Dieter et al. | | 123/179.15 |
| 5,233,944 A * | 8/1993 | Mochizuki | | 123/1 A |
| 5,988,137 A | 11/1999 | Tamura et al. | | |
| 7,168,409 B2 * | 1/2007 | Fukasawa | | 123/305 |
| 7,287,509 B1 * | 10/2007 | Brehob | | 123/299 |
| 7,426,908 B2 * | 9/2008 | Brehob | | 123/25 C |
| 7,909,019 B2 * | 3/2011 | Stein | | 123/406.23 |
| 8,165,788 B2 * | 4/2012 | Surnilla et al. | | 701/113 |
| 8,166,952 B2 * | 5/2012 | Bidner et al. | | 123/472 |
| 8,235,024 B2 * | 8/2012 | Zubeck et al. | | 123/304 |
| 2005/0166891 A1 | 8/2005 | Fukasawa | | |
| 2011/0203552 A1 * | 8/2011 | Aso et al. | | 123/443 |
| 2012/0203443 A1 * | 8/2012 | Surnilla et al. | | 701/103 |
| 2012/0239276 A1 * | 9/2012 | Nishiumi | | 701/103 |

FOREIGN PATENT DOCUMENTS

| | | |
|---|---|---|
| JP | 3-51179 | 5/1991 |
| JP | 5-272364 | 10/1993 |
| JP | 10-68341 | 3/1998 |
| JP | 2000-27649 | 1/2000 |
| JP | 2002-227651 | 8/2002 |
| JP | 2002-332849 | 11/2002 |
| JP | 2003-322022 | 11/2003 |
| JP | 2004-60650 | 2/2004 |
| JP | 2004-204717 | 7/2004 |
| JP | 2005-180247 | 7/2005 |
| JP | 2006-70863 | 3/2006 |

* cited by examiner

| ALCOHOL CONCENTRATION | LOWER THAN PREDETERMINED ~~CONCENTRATION α~~ | EQUAL TO OR HIGHER THAN PREDETERMINED ~~CONCENTRATION α~~ |
|---|---|---|
| INJECTION DIRECTION | INJECTION DIRECTION FOR GASOLINE | INJECTION DIRECTION FOR MIXED FUEL |

CONTROL APPARATUS AND CONTROL METHOD FOR DIRECT INJECTION SPARK IGNITION INTERNAL COMBUSTION ENGINE

BACKGROUND OF THE INVENTION

1. Field of the Invention

The invention relates to a control apparatus and a control method for a direct injection spark ignition internal combustion engine.

2. Description of the Related Art

Tumble flows are created in a direct injection spark ignition internal combustion engine, and the tumble flows are moderately intensified using fuel injected at a timing near the intake stroke bottom dead center so that the tumble flows remain active until ignition. The intensified tumble flows make the movement of air-fuel mixtures at the time of ignition stronger, and this brings about a moderate increase in the combustion speed and thus provides a good condition for homogenous combustion. Among the technologies related to such fuel injection, for example, Japanese Patent Application Publication JP-A-2003-322022 recites a fuel injection control apparatus that intensifies a circulating flow in each engine cylinder using the fuel injected from a fuel injection valve. Further, as a technology for intensifying the intake flow in each cylinder during homogenous combustion, for example, Japanese Patent Application Publication JP-A-2005-180247 recites an intake control apparatus for a direct injection spark ignition internal combustion engine which intensifies the intake flow by controlling an intake flow control valve provided in an intake passage.

In recent years, there are known FFVs (Flexible Fuel Vehicles) that can run on mixed fuel containing gasoline and alcohol (will be simply referred to as "alcohol-mixed fuel" where appropriate) as well as on normal gasoline. Containing a different amount of carbon atoms from gasoline, alcohol-mixed fuel requires a stoichiometric air-fuel ratio lower than the stoichiometric air-fuel ratio for gasoline. More specifically, for example, when gasoline is used, the stoichiometric air-fuel ratio is about 14.5. When alcohol-mixed fuel is used, on the other hand, the stoichiometric air-fuel ratio may become 9 or so depending upon the alcohol concentration. Thus, when fuel having a property that requires a stoichiometric air-fuel ratio lower than the stoichiometric air-fuel ratio for gasoline, which may be fuel other than alcohol-mixed fuel, is used in a direct injection spark ignition internal combustion engine, the mass of the fuel per the air amount drawn into each engine cylinder during homogenous combustion becomes larger than it is when gasoline is used, and as a result, the airflow intensifying effect of the injected fuel becomes stronger. In this case, the combustion speed increases and therefore the cooling loss increases. As such, in FFVS, there is a possibility that the heat efficiency decreases due to an excessive increase in the combustion speed. Meanwhile, in the case where fuel having a property that requires a stoichiometric air-fuel ratio higher than the stoichiometric air-fuel ratio for gasoline, the mass of the fuel per the air amount drawn into each engine cylinder during homogenous combustion becomes smaller than it is when gasoline is used, and therefore there is a possibility that the airflow intensifying effect of the injected fuel becomes weaker and thus the intensity of tumble flow becomes insufficient.

SUMMARY OF THE INVENTION

The invention provides a control apparatus and a control method for a direct injection spark ignition internal combustion engine that, when intensifying tumble flow using injected fuel during homogenous combustion, provide a good condition for homogenous combustion by changing the combustion state based on the fuel property.

A first aspect of the invention relates to a control apparatus for a direct injection spark ignition internal combustion engine that creates a tumble flow in the engine cylinder and intensifies the tumble flow using fuel injected at a timing near an intake stroke bottom dead center during homogenous combustion. The control apparatus includes: fuel property identifying means for identifying the property of the fuel; and combustion state changing means for changing the combustion state based on the identified fuel property. According to this control apparatus, the combustion speed is changed by changing the combustion state based on the fuel property. Thus it is possible to prevent the combustion speed from increasing or decreasing excessively. According to the invention, therefore, homogenous combustion can be performed in a good condition even when fuel having a different property is used.

The control apparatus described above may be such that the combustion state changing means changes, based on the identified fuel property, the degree to which the tumble flow is intensified by the fuel. According to this structure, excessive increase and decrease in the combustion speed are prevented by changing the tumble flow intensification degree based on the fuel property. Thus, according to the invention, homogenous combustion can be performed in a good condition even when fuel having a different property is used.

Further, the control apparatus described above may be such that the combustion state changing means changes the tumble flow intensification degree by changing the thrust force of the fuel. According to this structure, the tumble flow intensification degree can be changed by changing the thrust force of the fuel.

Further, the control apparatus described above may be such that the combustion state changing means changes the tumble flow intensification degree by changing the injection timing of the fuel. According to this structure, the tumble flow intensification degree can be changed also by changing the fuel injection timing.

Further, the control apparatus described above may be such that the combustion state changing means changes the tumble flow intensification degree by changing the injection direction of the fuel. According to this structure, the tumble flow intensification degree can be changed also by changing the fuel injection direction.

Further, the control apparatus described above may be such that the fuel state identifying means detects the property of the fuel by detecting the concentration of alcohol in the fuel and the combustion state changing means shifts the injection timing of the fuel away from near the intake stroke bottom dead center as the alcohol concentration detected by the fuel property identifying means is higher. Because the stoichiometric air-fuel ratio for alcohol-mixed fuel is lower than that for gasoline, when alcohol-mixed fuel is used, if it is injected at a timing near the intake stroke bottom dead center during homogenous combustion so as to intensify tumble flow, the tumble flow intensifying energy of the injected fuel becomes excessive. To counter this, according to the structure described above, the movement of air-fuel mixture at the time of ignition is suppressed by shifting the ignition timing from near the intake stroke bottom dead center. This prevents an excessive increase in the combustion speed and thus reduces the cooling loss, whereby the heat efficiency improves. As a result, the homogenous combustion can be performed in a good condition.

Further, the control apparatus described above may be such that the combustion state changing means shifts the injection timing of the fuel away from near the intake stroke bottom dead center by advancing the injection timing from the intake stroke bottom dead center. According to this structure, the time period from fuel injection to ignition is extended to prevent an excessive increase in the combustion speed and thus improve the degree of mixing of air-fuel mixtures. This makes it easier to provide a good condition for homogenous combustion by changing the injection timing.

Further, the control apparatus according to the first aspect of the invention may be such that the combustion state changing means retards the ignition timing when the fuel has a property that requires a stoichiometric air-fuel ratio lower than the stoichiometric air-fuel ratio for gasoline. When the fuel has such a property, the movement of air-fuel mixture at the time of ignition becomes stronger and therefore the combustion speed will increase excessively. To counter this, according to the structure described above, an excessive increase in the combustion speed is prevented by retarding the ignition timing so that the combustion progresses moderately. As such, the reduction of the heat efficiency can be suppressed, and therefore homogenous combustion can be performed in a good condition.

Further, the control apparatus according to the first aspect of the invention may be such that the combustion state changing means increases an EGR amount when the fuel has a property that requires a stoichiometric air-fuel ratio lower than the stoichiometric air-fuel ratio for gasoline. According to this structure, when the fuel has such a property, the combustion speed is reduced by increasing the EGR amount. This prevents an excessive increase in the combustion speed and thus suppresses the reduction of the heat efficiency, whereby homogenous combustion can be obtained in a good condition.

A second aspect of the invention relates to a method for controlling a direct injection spark ignition internal combustion engine that creates a tumble flow in the engine cylinder and intensifies the tumble flow using fuel injected at a timing near an intake stroke bottom dead center during homogenous combustion. The control method includes: identifying the property of the fuel; and changing the combustion state based on the identified fuel property.

As such, when intensifying tumble flow using injected fuel during homogenous combustion, the control apparatus and method according to the invention provide a good condition for homogenous combustion by changing the combustion state based on the fuel property.

BRIEF DESCRIPTION OF THE DRAWINGS

The foregoing, features and advantages of the invention will become apparent from the following description of example embodiments with reference to the accompanying drawings, wherein like numerals are used to represent like elements and wherein.

DETAILED DESCRIPTION OF THE EXEMPLARY EMBODIMENTS

Hereinafter, the first to fifth exemplary embodiments of the invention will be described in detail with reference to the drawings.

First Exemplary Embodiment

Figure 1:
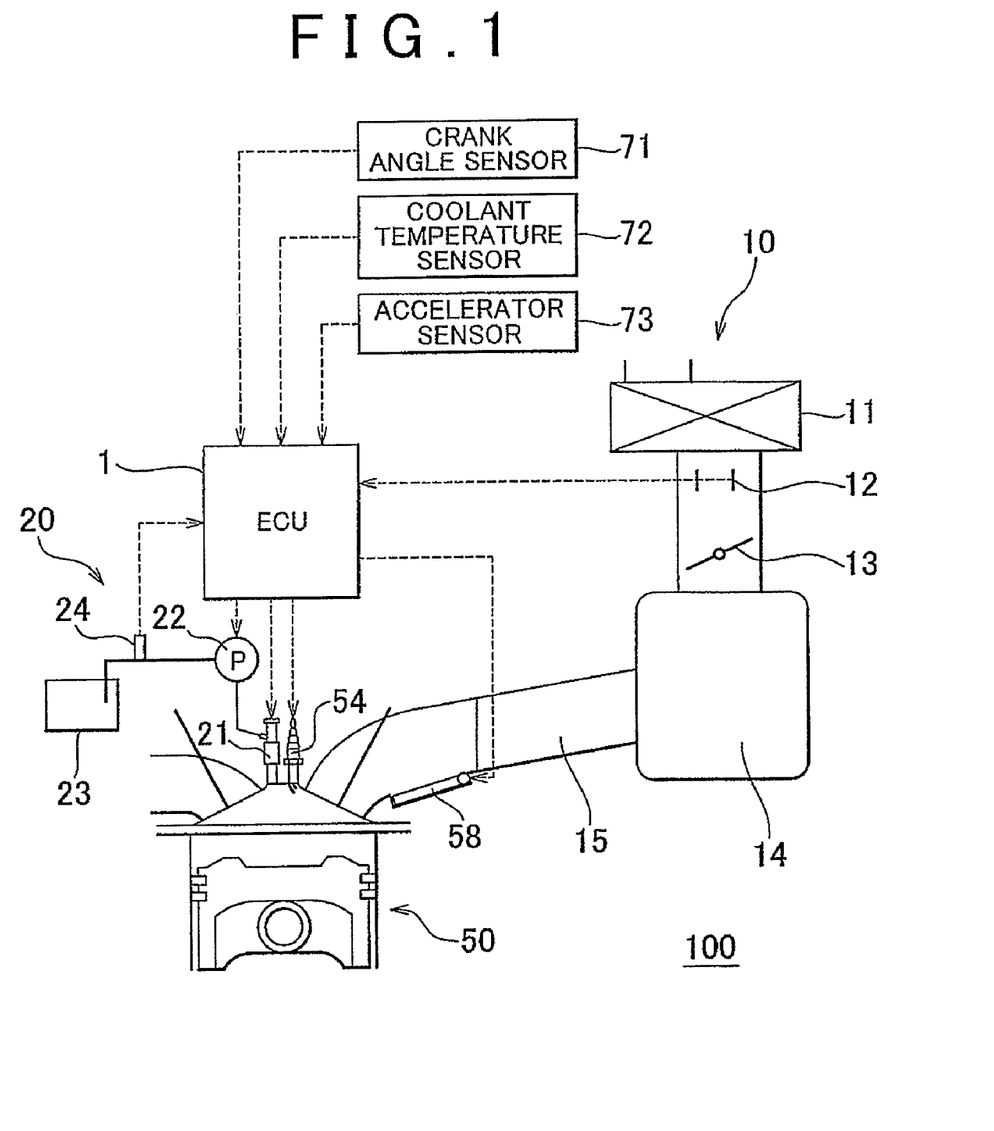
FIG. 1 is a view schematically showing an ECU of the first exemplary embodiment of the invention together with an internal combustion engine system.

FIG. 1 is a view schematically showing a control apparatus for a direct injection spark ignition internal combustion engine according to the first exemplary embodiment of the invention, which is provided as an ECU (Electronic Control Unit) 1, together with an internal combustion engine system 100. The internal combustion engine system 100 is constituted of an intake system 10, a fuel injection system 20, and an internal combustion engine 50. The intake system 10 is used to introduce air into the internal combustion engine 50. The intake system 10 is constituted of an air cleaner 11 for filtering air, an airflow meter 12 for measuring the amount of air, a throttle valve 13 for adjusting the flowrate of intake air, a surge tank 14 for storing intake air temporarily, an intake manifold 15 through which the intake air is distributed to the respective cylinders of the internal combustion engine 50, intake pipes that are provided between these components of the intake system, etc.

The fuel injection system 20 is constituted of fuel injection valves 21 for injecting fuel into the corresponding cylinders of the internal combustion engine 50, a fuel pump 22 for supplying fuel to each fuel injection valve 21, a fuel tank 23, etc. Each fuel injection valve 21 is opened under the control of the ECU 1 to inject fuel at appropriate injection timings. The fuel injection amount is adjusted by the valve-open time period, which is the time period from when the fuel injection valve 21 is opened to when it is closed, being adjusted under the control of the ECU 1. The fuel pump 22 is used to produce injection pressure by pressurizing fuel. The fuel pump 22 adjusts, under the control of the ECU 1, the initial injection pressure to a desired injection pressure. The fuel injection valve 21 has two injection holes and injects fuel in a desired direction under the control of the ECU 1. More specifically, the fuel injection valve 21, when injecting fuel under the control of the ECU 1, controls the fuel injection direction by opening only either one of the two injection holes. Note that each fuel injection valve 21 does not necessarily have two injection holes except in the third exemplary embodiment that will be described later.

An alcohol concentration sensor 24 is provided in a fuel passage that leads to the fuel tank 23. The alcohol concentration sensor 24 is used to detect the concentration of alcohol in the fuel. The alcohol concentration sensor 24 is constituted of a pair of electrodes, etc., and detects changes in electric current that occur when the electric conductivity of the fuel changes as the alcohol concentration in the fuel changes. Alternatively, the alcohol concentration sensor 24 may be other type of alcohol concentration detection sensor, such as a resistance detection type alcohol detection sensor, a capacitance type alcohol detection sensor, and an optical type alcohol detection sensor. To obtain the alcohol concentration, instead of using the alcohol concentration sensor 24, the alcohol concentration may be estimated based on the air-fuel ratio in the exhaust gas that is obtained from the output signals of an oxygen sensor or an air-fuel ratio sensor, not shown in the drawings.

Figure 2:
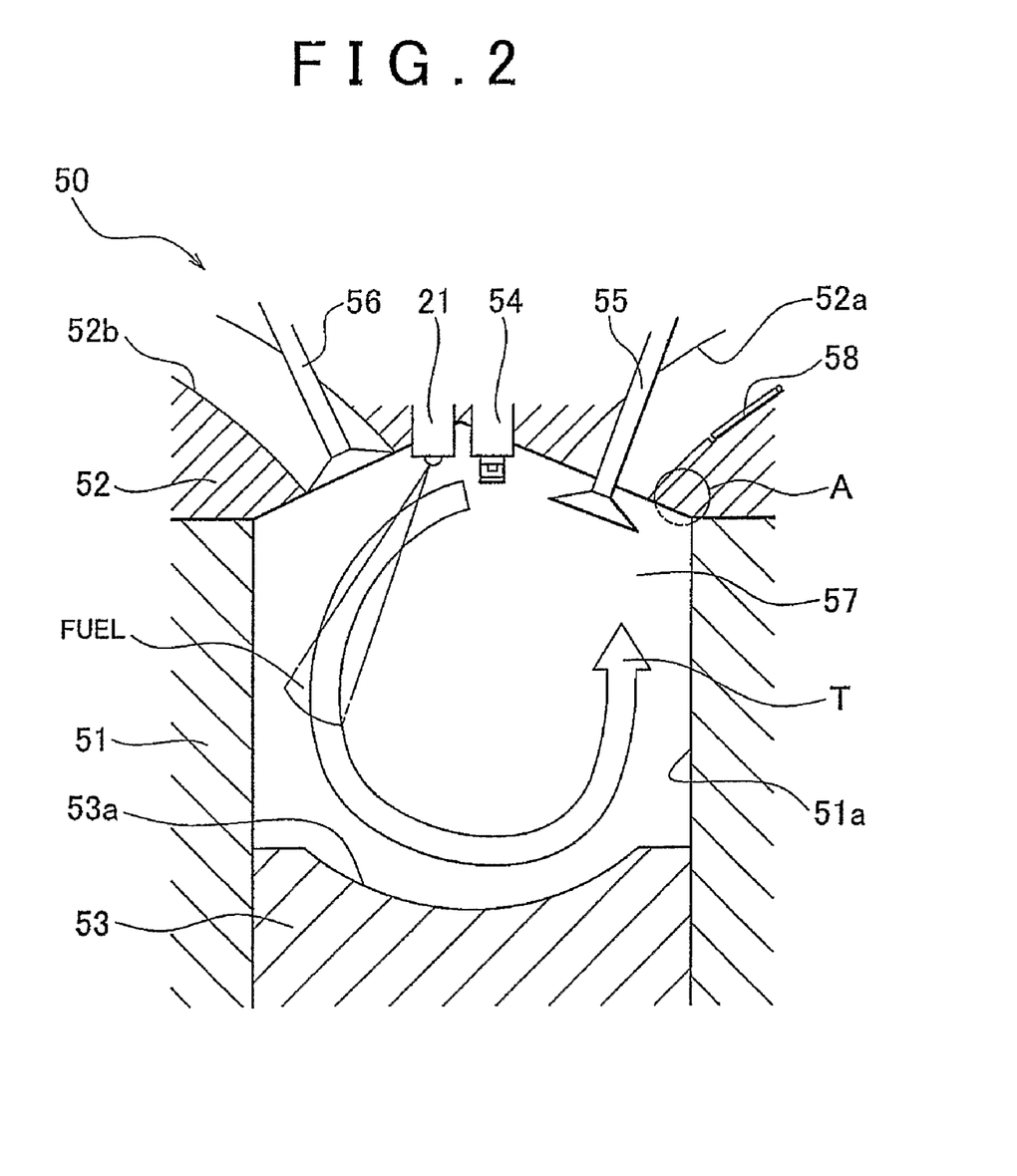
FIG. 2 is a view schematically showing the main portion of the internal combustion engine shown in FIG. 1.

FIG. 2 is a view schematically showing the main portion of the internal combustion engine 50. The internal combustion engine 50 is constituted of a cylinder block 51, a cylinder head 52, pistons 53, ignition plugs 54, intake valves 55, and exhaust valves 56. The internal combustion engine 50 of the first exemplary embodiment is an inline four-cylinder direct injection spark ignition internal combustion engine. Note that internal combustion engines to which the invention can be applied are not limited to any specific cylinder layout nor any specific cylinder number. Also, note that FIG. 2 only shows one of the four cylinders 51a as a representative and the structures of other cylinders are the same as that shown in FIG. 2. The cylinders 51a, which are substantially cylindrical, are formed in the cylinder block 51. The piston 53 is housed in each cylinder 51a. A cavity 53a for guiding tumble flow T is formed in the top face of each piston 53. A combustion chamber 57 is the space surrounded by the cylinder block 51, the cylinder head 52, and the piston 53 in each cylinder 51a. Intake ports 52a for guiding intake air into the respective combustion chambers 57 and exhaust ports 52b for discharging combustion gas from the respective combustion chambers 57 are formed in the cylinder head 52. Further, intake valves 55 for opening and closing the respective intake ports 52a and exhaust valves 56 for opening and closing the respective exhaust ports 52b are provided in the cylinder head 52. Note that the number of the intake valves 55 and the number of the exhaust valves 56 for each cylinder are not limited to any specific numbers.

The ignition plugs 54 are mounted in the cylinder head 52. The electrode of each ignition plugs 54 projects downward to substantially the center of the upper area of the corresponding combustion chamber 57. In each cylinder 51a, the fuel injection valve 21 is provided adjacent to the ignition plug 54 in the upper area such that the fuel injection valve 21 protrudes into the combustion chamber 57. The position of each fuel injection valve 21 is not limited to this position. For example, each fuel injection valve 21 may alternatively be arranged in the cylinder head 52 such that the injection hole portion of the fuel injection valve 21 protrudes into the combustion chamber 57 from the intake port 52a side (Position A in FIG. 2). Further, two or more fuel injection valves 21 may be provided for each cylinder.

Airflow control valves 58 are provided in the respective intake ports 52a. The airflow control valves 58 are used to produce tumble flow T within the combustion chambers 57. The airflow control valves 58 produce, under the control of the ECU 1 tumble flow T within the combustion chambers 57 by biasing the intake air in the intake ports 52a. The means for producing tumble flow T within the combustion chambers 57 is not limited to the airflow control valves 58. For example, each intake port 52a may be formed in a shape that produces tumble flow in the cylinder 51a. Also, various other means may be used to produce tumble flow T in the cylinders 51a. In the first exemplary embodiment, each fuel injection valve 21 injects, under the control of the ECU 1, fuel at a timing near the bottom dead center of an intake stroke (will be referred to as "intake stroke bottom dead center") during homogenous combustion. The injected fuel intensifies the tumble flow T moderately, so that the intensified tumble flow T remains active until ignition. The intensified tumble flow T makes the movement of air-fuel mixture at the time of ignition stronger, and this brings about a moderate increase in the combustion speed and thus provides a good condition for homogenous combustion. Note that within each cylinder 51a, the tumble flow T swirls in the normal direction, flowing upward in the intake valve 55 side of the combustion chamber 57.

During homogenous combustion, it is difficult to produce sufficiently strong tumble flows T by simply increasing the intake amount by opening the airflow control valve 58 to a half degree or to a full degree or through the shape of each intake port 52a. That is, despite the use of these means, there is still a room for improvement of the degree of mixing of air-fuel mixtures and flame propagation for homogenous combustion. Further, the internal combustion engine 50 is provided with various sensors, such as a crank angle sensor 71 for generating output pluses corresponding to an engine speed Ne and a coolant temperature sensor 72 for detecting the temperature of the coolant of the internal combustion engine 50.

The ECU 1 is constituted of a CPU (Central Processing Unit), a ROM (Read Only Memory), a RAM (Random Access Memory), an input/output circuit, and so on, which are not shown in the drawings. The ECU 1 is mainly used to control the internal combustion engine 50. In the first exemplary embodiment, the ECU 1 is adapted to control the ignition plugs 54 (more specifically, igniters, not shown in the drawings), the airflow control valves 58 (more specifically, the actuators for the airflow control valves 58, which are not shown in the drawings), etc., as well as the fuel injection valves 21 and the fuel pump 22. As well as these components, various other control objects are connected to the ECU 1 via corresponding drive circuits (not shown in the drawings). Further, various sensors are connected to the ECU 1, such as the airflow meter 12, the alcohol concentration sensor 24, the crank angle sensor 71, the coolant temperature sensor 72, and an accelerator sensor 73 that detects the travel (operation amount) of an accelerator pedal, which is not shown in the drawings.

The ROM is used to store various programs each containing instructions corresponding to various processes that the CPU executes, such as an engine control program for controlling the internal combustion engine 50, a fuel property identification program for identifying the property of fuel, and a fuel injection valve control program for controlling the fuel injection valve 21. Note that the fuel property identification program and the fuel injection valve control program may be provided as part of the engine control program. Specifically, the fuel property identification program is formulated to detect the alcohol concentration based on the output signals of the alcohol concentration sensor 24 and determine whether the fuel is gasoline or alcohol-mixed fuel. Note that the fuel property identification program may be formulated to estimate the alcohol concentration and determine, based on the result of the estimation, whether the fuel is gasoline or alcohol mixed fuel.

The fuel injection valve control program includes an injection amount control program for controlling the fuel injection amount, an injection pressure control program for controlling the fuel injection pressure, and an injection direction control program for controlling the fuel injection direction. According to the first exemplary embodiment, the fuel injection pressure program includes an injection pressure specified control program that changes the fuel injection pressure based on the fuel property during homogenous combustion.

Figure 3:
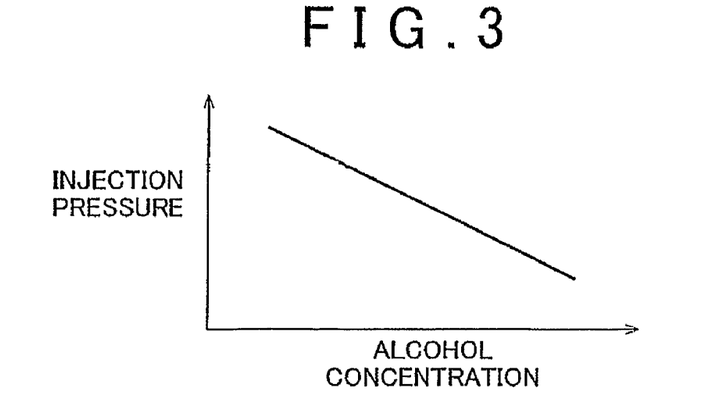
FIG. 3 is a view schematically showing an injection pressure map data that is stored in the ECU of the first exemplary embodiment.

More specifically, according to the injection pressure specified control program, an injection pressure corresponding to the alcohol concentration detected by the alcohol concentration sensor 24 is read out from a map data defining the relation between the alcohol concentration and the injection pressure (will be simply referred to as "injection pressure map") during homogeneous combustion, and a fuel injection pump 22 is controlled to inject fuel at the injection pressure read out from the injection pressure map. FIG. 3 schematically shows the injection pressure map defining the relation between the alcohol concentration and the injection pressure. In the first exemplary embodiment, this injection pressure map is stored in the ROM. When the alcohol concentration is 0% in this map, it indicates that the fuel is normal gasoline. In this case, fuel is injected at a timing near the intake stroke bottom dead center and at the injection pressure corresponding to the 0% alcohol concentration, whereby the tumble flow is intensified moderately and homogenous combustion is performed in a good condition.

However, as the alcohol concentration increases, the stoichiometric air-fuel ratio becomes lower than the stoichiometric air-fuel for gasoline. In such a case, therefore, if alcohol-mixed fuel is injected without changing the injection pressure based on the alcohol concentration during homogenous combustion, the combustion speed increases excessively, which reduces the heat efficiency. Therefore, the foregoing injection pressure map defines the relation between the alcohol concentration and the fuel injection pressure such that the fuel injection pressure decreases as the alcohol concentration increases. Thus, the thrust force of fuel decreases as the alcohol concentration increases, and this prevents excessive intensification of tumble flow T and thus an excessive increase in the combustion speed. Note that the injection pressure map is not necessarily formulated to define a linear relation between the alcohol concentration and the fuel injection pressure. In the first exemplary embodiment, various detecting means and determining means are provided as the CPU, the ROM, the RAM (will be simply referred to as "CPU, etc."), and the programs for controlling the internal combustion engine control 50. In particular, "fuel property identifying means" is provided as the CPU, etc. and the fuel property identification program, and "combustion state changing means" is provided as the CPU, etc. and the injection pressure specified control program.

Figure 4:
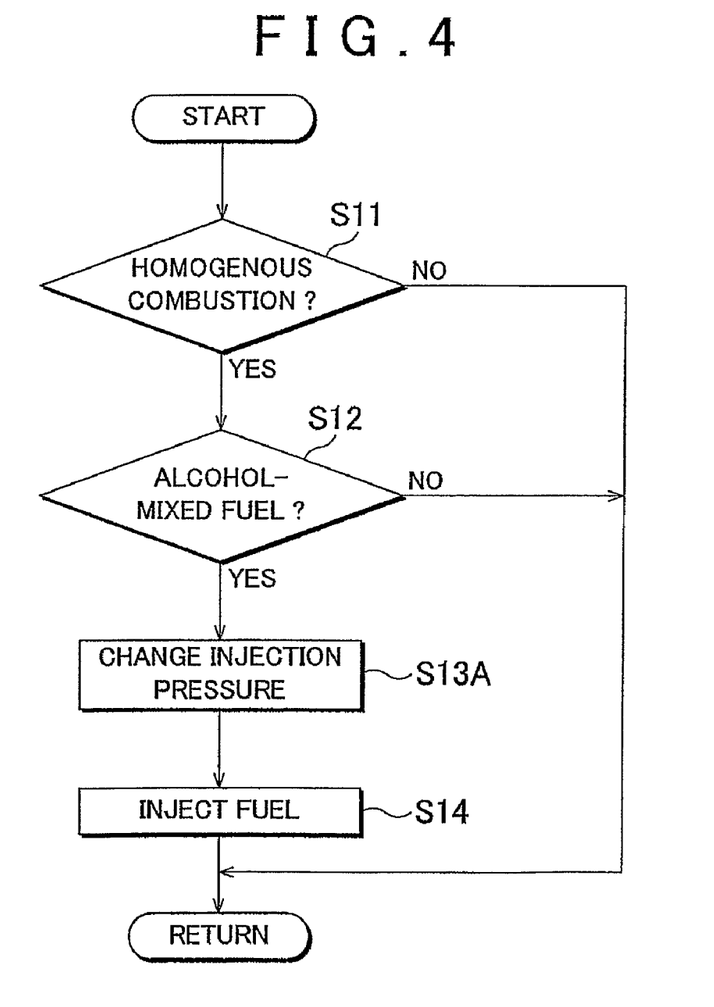
FIG. 4 is a flowchart illustrating the processes that ECU of the first exemplary embodiment executes.

Next, a description will be made, with reference to the flowchart in FIG. 4, of the processes that the ECU 1 executes to change the degree to which to intensify tumble flow T based on the fuel property. The ECU 1 controls the internal combustion engine 50 by executing the processes shown in the flowchart repeatedly. At this time, the CPU executes the programs stored in the ROM, such as the engine control program, the fuel property identification program, the fuel injection valve control program, etc. The CPU determines whether the combustion presently performed in the internal combustion engine 50 is homogenous combustion (step S11).

This determination can be made, for example, based on the engine speed Ne detected from the output signals of the crank angle sensor 71, the load detected from the output signals of the accelerator sensor 73, and a combustion mode map data defined by the engine speed Ne and the load. In the first exemplary embodiment, this combustion mode map data is also stored in the ROM. If the determination in step S11 is negative, the CPU repeats the process of step S11 until a positive determination is made.

On the other hand, if the determination in step S11 is positive, the CPU executes a process for determining, based on the output signals of the alcohol concentration sensor 24, whether the presently used fuel is alcohol-mixed fuel, that is, a process for identifying the fuel property (step S12). In step S12, the alcohol concentration is detected, and whether the fuel is gasoline or alcohol-mixed fuel is determined. If the fuel is identified as gasoline, a negative determination is made in step S12. In this case, the control routine returns to step S11. On the other hand, if the fuel is identified as alcohol-mixed fuel, a positive determination is made in step S12. In this case, the CPU reads out the fuel injection pressure corresponding to the alcohol concentration from the fuel injection pressure map and controls the fuel pump 22 such that fuel will be injected at the read injection pressure (step S13A). As such, the thrust force of fuel is changed in accordance with the fuel property so that the degree to which tumble flow T is intensified changes accordingly.

Then, the CPU executes a process for controlling the fuel injection valve 21 so as to inject fuel at a timing near the intake stroke bottom dead center (step S14). Because the thrust force of fuel has been changed based on the fuel property in step S13A, the fuel injected in step S14 intensifies tumble flow T moderately. This prevents an excessive increase in the combustion speed and thus improves the heat efficiency, whereby homogenous combustion can be performed in a good condition. As such, when intensifying tumble flow using injected fuel, the ECU 1 of the first exemplary embodiment provides a good condition for homogenous combustion by changing the manner of fuel injection in accordance with the fuel property.

Second Exemplary Embodiment

The structure of the ECU 1 of the second exemplary embodiment is the same as that of the ECU 1 of the first exemplary embodiment except that the ECU 1 does not have the injection pressure specified control program and that the injection timing control program includes an injection timing specified control program that will be described below. Note that the ECU 1 of the second exemplary embodiment may also have the injection pressure specified control of the first exemplary embodiment. Also, note that the configuration of the internal combustion engine system 100 incorporating the ECU 1 of the second exemplary embodiment is the same as that shown in FIG. 1. When the injection timing specified control program is formulated as follows. An injection timing corresponding to the detected alcohol concentration is read out from a map data defining the relation between the alcohol concentration and the injection timing (will be simply referred to as "injection timing map"), and the injection timing of fuel is then controlled to the timing read out from the injection timing map.

Figure 5:
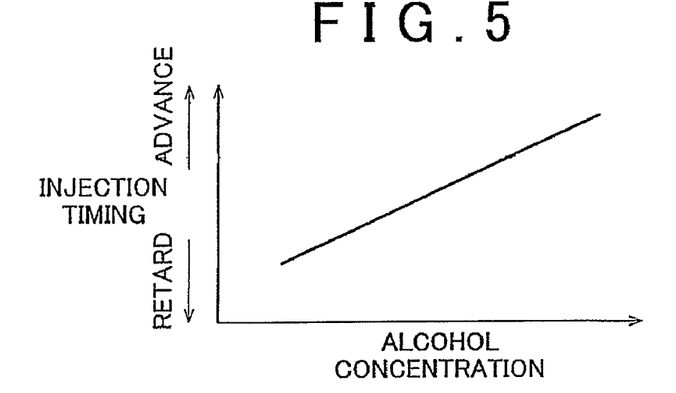
FIG. 5 is a view schematically showing an injection timing map data that is stored in the ECU of the second exemplary embodiment.

FIG. 5 schematically shows the injection timing map defining the relation between the alcohol concentration and the fuel injection timing. In the second exemplary embodiment, this map is also stored in the ROM. According to this map, when the alcohol concentration is 0%, the injection timing is set near the intake stroke bottom dead center. However, because the stoichiometric air-fuel ratio decreases as the alcohol concentration increases, if alcohol-mixed fuel is injected during homogenous combustion without changing the injection timing based on the alcohol concentration, the combustion speed increases excessively, and this reduces the heat efficiency. Therefore, the injection timing map is formulated such that the injection timing is advanced as the alcohol concentration increases. As such, the time period from fuel injection to ignition is extended as the alcohol concentration increases, which prevents an excessive increase in the combustion speed and thus improves the degree of mixing of air-fuel mixtures.

Meanwhile, the injection timing may be retarded as the alcohol concentration increases. That is, when tumble flow T is intensified to increase the combustion speed during homogenous combustion, the injection timing is set to an optimum timing near the intake stroke bottom dead center. Therefore, by shifting the injection timing from near the intake stroke bottom dead center, an excessive increase in the combustion speed can be prevented. Also, the injection timing map is not necessarily formulated to define a linear relation between the alcohol concentration and the fuel injection timing. In the second exemplary embodiment, "combustion state changing means" is provided as the CPU, etc. and the injection timing specified control program, and "control apparatus for a direct injection spark ignition internal combustion engine" is provided as the ECU 1.

Figure 6:
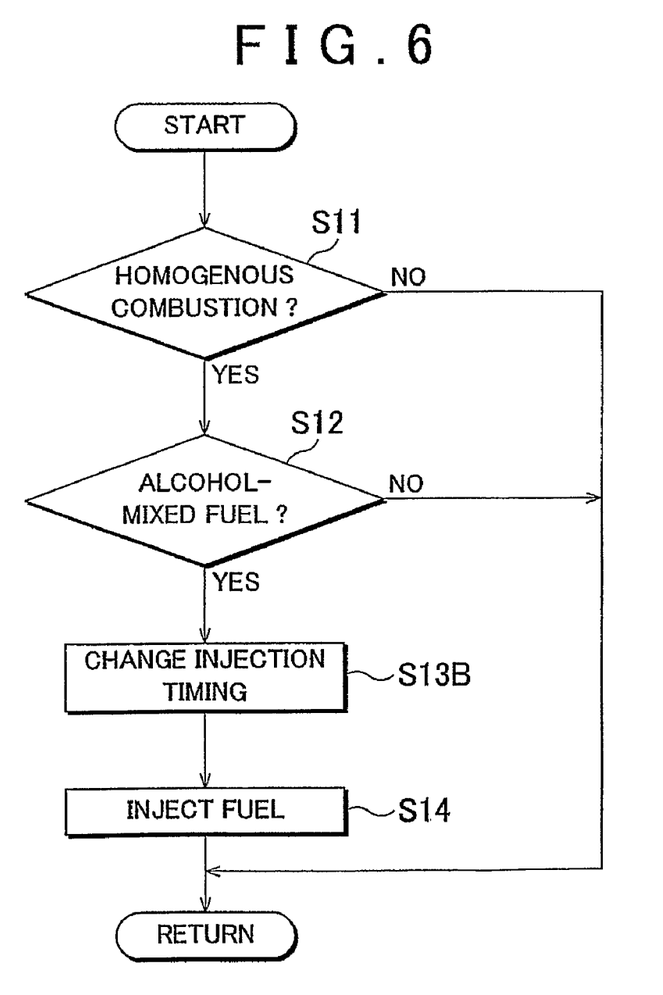
FIG. 6 is a flowchart illustrating the processes that ECU of the second exemplary embodiment executes.

Next, a detailed description will be made, with reference to the flowchart of FIG. 6, of the control routine that the ECU 1 executes to change the tumble flow intensification degree based on the fuel property. The control routine shown in FIG. 6 is the same as that shown in FIG. 4 except that step S13A has been replaced by step S13B, and therefore the process of step S13B will be focused on in the following description. If a positive determination is made in step S12, the CPU then reads out the injection timing corresponding to the alcohol concentration detected in step S12 from the injection timing map (step S13B). Then, the CPU executes a process for controlling the fuel injection valve 21 so as to inject fuel at the injection timing read in step S13B (step S14). As such, the injection timing is changed based on the fuel property so that the tumble flow intensification degree changes accordingly. Further, according to the above control, the combustion speed is suppressed to a moderate level, therefore homogenous combustion can be performed in a good condition. As such, when intensifying tumble flow using the injected fuel, the ECU 1 of the second exemplary embodiment provides a good condition for homogenous combustion by changing the manner of fuel injection in accordance with the fuel property.

Third Exemplary Embodiment

The structure of the ECU 1 of the third exemplary embodiment is the same as that of the ECU 1 of the first exemplary embodiment except that the injection pressure control program does not include the injection pressure specified control program of the first exemplary embodiment and that the injection direction control program includes an injection direction specified control program that will be described below. Note that the ECU 1 of the third exemplary embodiment may have the injection pressure specified control of the first exemplary embodiment and/or the injection timing specified control of the second exemplary embodiment. Also, note that the configuration of the internal combustion engine system 100 incorporating the ECU 1 of the third exemplary embodiment is the same as that shown in FIG. 1. The injection direction specified control program is formulated as follows. The injection direction corresponding to the detected alcohol concentration is read out from a map data defining the relation between the alcohol concentration and the injection direction (will be simply referred to as "injection direction map"), and the injection direction is then controlled to the direction read out from the injection timing map by controlling the fuel injection valve 21.

Figure 7:
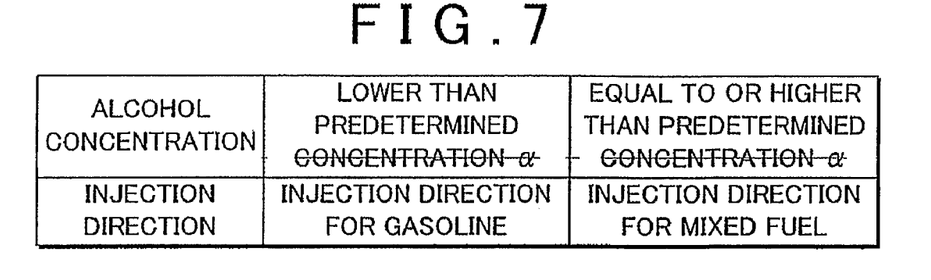
FIG. 7 is a view schematically showing an injection direction map data that is stored in the ECU of the third exemplary embodiment.

FIG. 7 schematically shows the injection direction map defining the relation between the alcohol concentration and the fuel injection direction. In the third exemplary embodiment, this map is also stored in the ROM. According to this map, when the alcohol concentration is 0%, the injection direction is set near the direction for injecting gasoline. However, because the stoichiometric air-fuel ratio becomes lower than the stoichiometric air-fuel ratio for gasoline as the alcohol concentration increases, if alcohol-mixed fuel is injected during homogenous combustion without changing the injection direction based on the alcohol concentration, the combustion speed increases excessively, and this reduces the heat efficiency. Therefore, the injection direction map is formulated such that when the alcohol concentration is equal to or higher than α, the fuel injection direction is set to a direction that is different from the fuel injection direction for injecting gasoline. By injecting alcohol-mixed fuel in the fuel injection direction different from that for injecting gasoline, excessive intensification of tumble flow is prevented, and therefore an excessive increase in the combustion speed can be prevented. In the third exemplary embodiment, "combustion state changing means" is provided as the CPU, etc. and the injection direction specified control program, and "control apparatus for a direct injection spark plug internal combustion engine" is provided as the ECU 1.

Figure 8:
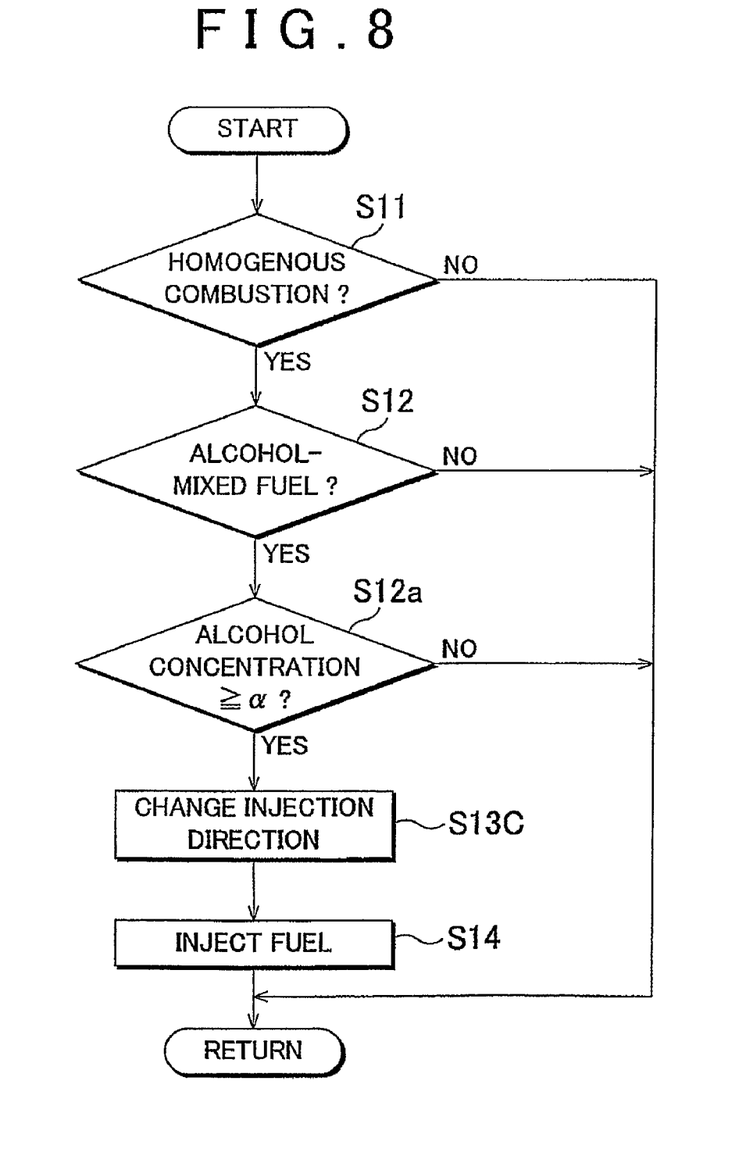
FIG. 8 is a flowchart illustrating the processes that ECU of the third exemplary embodiment executes.

Next, a description will be made, with reference to the flowchart in FIG. 8, of the processes that the ECU 1 executes to change the tumble flow intensification degree based on the fuel property. The control routine shown in FIG. 8 is the same as that shown in FIG. 4 except that step S13A has been replaced by step S13C, and therefore the process of step S13C will be focused on in the following description. If a positive determination is obtained in step S12, the CPU then reads out the injection direction corresponding to the alcohol concentration detected in step S12 from the injection direction map and executes a process for changing the injection direction to the direction for injecting alcohol-mixed fuel (step S13C). As such, the injection direction is changed based on the fuel property so that the tumble flow intensification degree changes accordingly. Then, the CPU executes a control for controlling the fuel injection valve 21 so as to inject fuel at a timing near the intake stroke bottom dead center (step S14). Because the injection direction has been changed based on the fuel property in step S13C, the fuel injected in step S14 intensifies tumble flow T moderately. As such, an excessive increase in the combustion speed is prevented and the heat efficiency improves accordingly, whereby homogenous combustion can be performed in a good condition.

While detailed description has been made only of the case in which the injection direction is changed based on the fuel property with reference to the flowchart of FIG. 8 in the exemplary embodiment described above, the injection pressure changing process of the first exemplary embodiment and/or the injection timing changing process of the second exemplary embodiment may be performed after a negative determination is obtained in step S12a or after the process of step S13c. For example, in the case where the injection pressure changing process and the injection timing changing process are executed when the alcohol concentration is lower than the predetermined concentration α, the condition of homogenous condition can be improved by changing the injection pressure and the injection timing appropriately. On the other hand, in the case where the injection pressure changing process and the injection timing changing process are performed after the injection direction is changed in step S13C, that is, when the alcohol concentration is equal to or higher than the predetermined concentration α, the amounts by which the injection timing and the injection pressure need be changed to obtain a good homogenous combustion condition are smaller than they are when the injection direction is not changed. Note that, in such cases, the injection pressure map and the injection timing map need to be formulated by factoring in the changing of the injection direction. As such, when intensifying tumble flow using the injected fuel, the ECU 1 of the third exemplary embodiment provides a good condition for homogenous combustion by changing the manner of fuel injection in accordance with the fuel property.

Fourth Exemplary Embodiment

Figure 9:
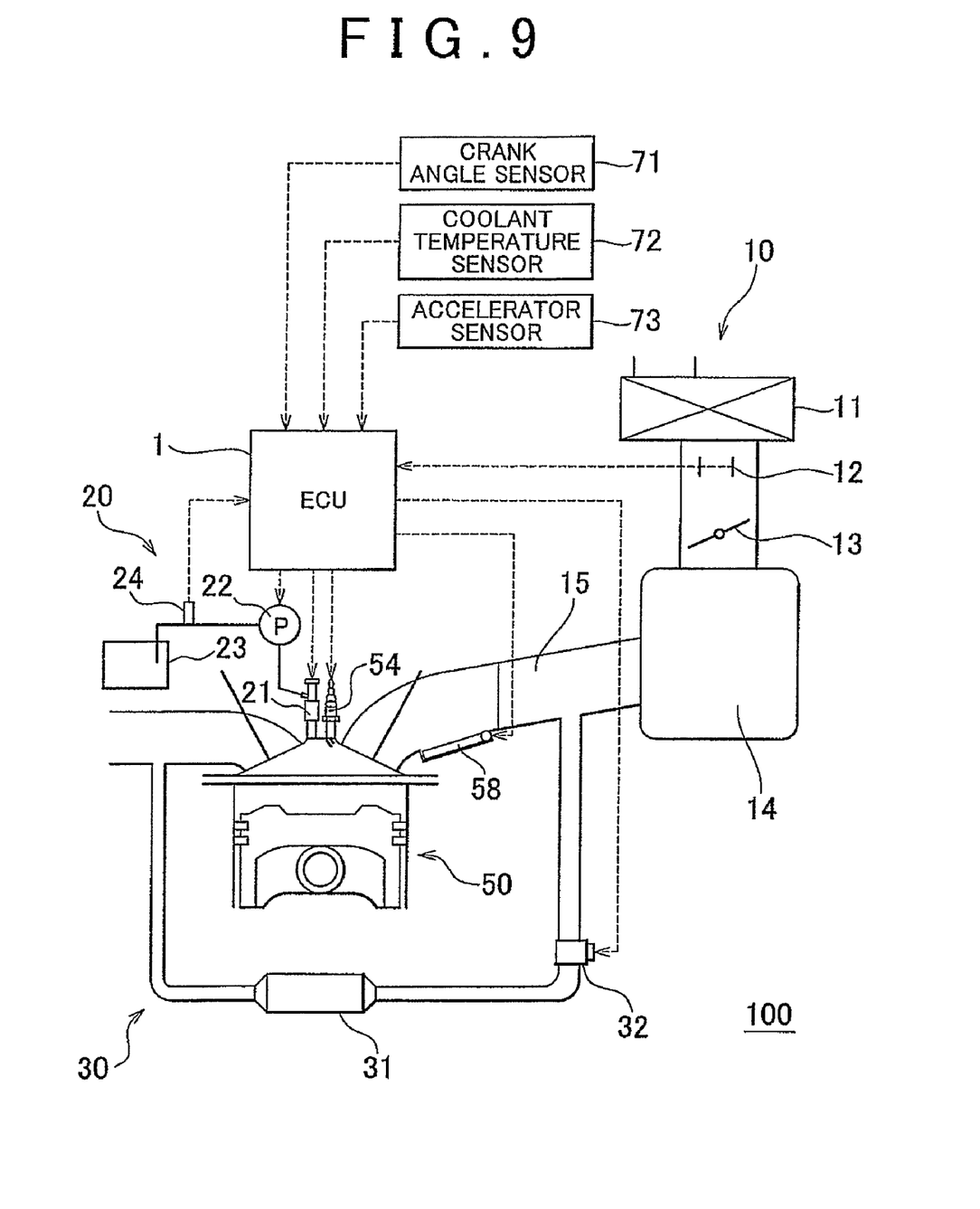
FIG. 9 is a view schematically showing an ECU of the fourth exemplary embodiment of the invention together with an internal combustion engine system.

FIG. 9 is a view schematically showing a control apparatus for a direct injection spark-ignition internal combustion engine according to the fourth exemplary embodiment of the invention, which is provided as an ECU (Electronic Control Unit) 1, together with the internal combustion engine system 100. In FIG. 9, the components and parts that are the same as those in the first exemplary embodiment are denoted by the same numerals, and their descriptions are omitted.

The internal combustion engine system 100 of the fourth exemplary embodiment has, in addition to the components of the internal combustion engine system 100 of the first exemplary embodiment, an exhaust gas recirculation system 30, an EGR (Exhaust Gas Recirculation) cooler 31, an EGR valve 32, connection pipes provided between the EGR cooler 31 and the EGR valve 32, etc. The EGR cooler 31 is used to cool the exhaust gas recirculated. The EGR valve 32 is used to recirculate exhaust gas. The EGR valve 32 closes and opens the EGR passage by adjusting its opening degree as needed under the control of the ECU 1.

In the fourth exemplary embodiment, the fuel injection valve 21 injects under the control of the ECU 1, fuel at a timing near the intake stroke bottom dead center during homogenous combustion. The injected fuel intensifies the tumble flow T moderately, and the intensified tumble flow T remains active until ignition. The intensified tumble flow T makes the movement of air-fuel mixture at the time of ignition stronger, and this brings out a moderate increase in the combustion speed and thus provides a good condition for homogenous combustion.

Figure 10:
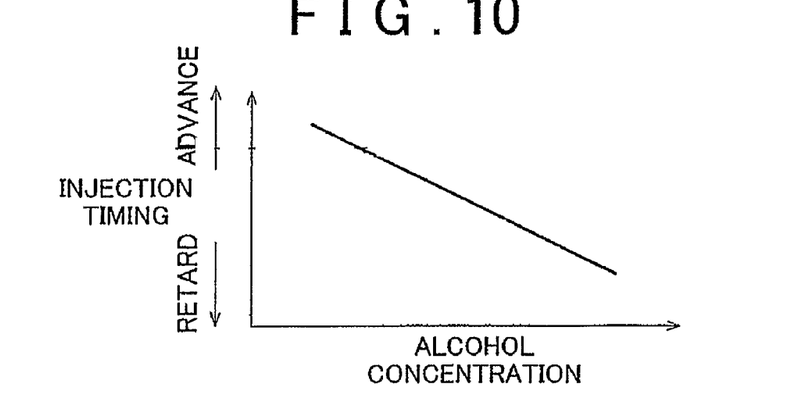
FIG. 10 is a view schematically showing an ignition timing map data that is stored in the ECU of the fourth exemplary embodiment.

In the fourth exemplary embodiment, the combustion state changing program includes an ignition timing specified control program that retards the ignition timing if the present fuel has a property that requires a stoichiometric air-fuel ratio that is different from the stoichiometric air-fuel ratio for gasoline. Specifically, according to the ignition timing specified control program, the ignition timing corresponding to the alcohol concentration detected based on the output signals of the alcohol concentration sensor 24 is read out from a map data defining the relation between the alcohol concentration and the ignition timing (will be simply referred to as "ignition timing map") during homogeneous combustion, and the ignition timing is then adjusted to the timing read out from the ignition timing map. FIG. 10 schematically shows the ignition timing map data defining the relation between the alcohol concentration and the ignition timing. In the fourth exemplary embodiment, this ignition timing map is also stored in the ROM. When the alcohol concentrate is 0% in this map, it indicates that the fuel is normal gasoline. In this case, fuel is injected at a timing close the intake stroke bottom dead center, whereby the tumble flow is intensified moderately and homogenous combustion is performed in a good condition.

However, because the stoichiometric air-fuel ratio becomes lower than the stoichiometric air-fuel ratio for gasoline as the alcohol concentration increases, if alcohol-mixed fuel is ignited at the same timing as gasoline, the combustion state will be similar to that obtained with an advanced ignition timing. In this case, the combustion speed increases excessively, and this reduces the heat efficiency. Therefore, the ignition timing map is formulated such that the ignition timing is retarded as the alcohol concentration increases. Thus, by thus retarding the ignition timing as the alcohol concentration increases, the combustion state is changed such that the combustion progresses moderately. As such, an excessive increase in the combustion speed is prevented. Note that the ignition timing map is not necessarily formulated to define a linear relation between the alcohol concentration and the ignition timing. In the fourth exemplary embodiment, various detecting means and determining means are provided as the CPU, the ROM, the RAM, and the programs for controlling the internal combustion engine 50. In particular, "fuel property identifying means" is provided as the CPU, etc. and the fuel property identification program, and "combustion state changing means" is provided as the CPU, etc. and the ignition timing specified control program.

Figure 11:
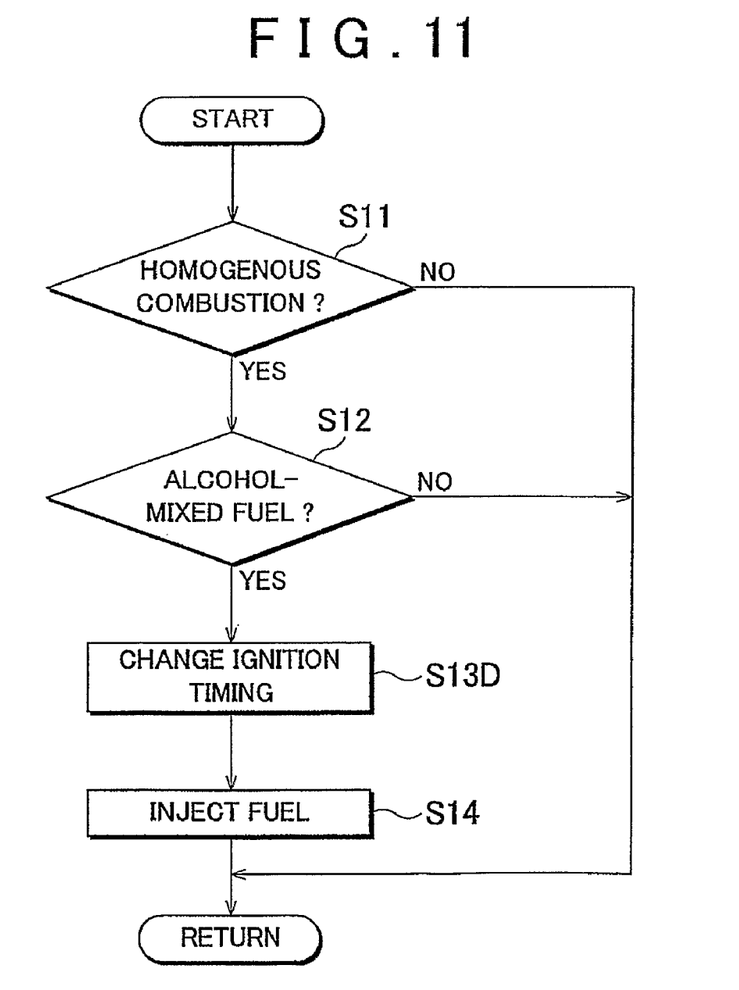
FIG. 11 is a flowchart illustrating the processes that ECU of the fourth exemplary embodiment executes.

Next, a description will be made, with reference to the flowchart in FIG. 11, of the processes that the ECU 1 executes to change the ignition timing based on the fuel property. The control routine shown in FIG. 11 is the same as that shown in FIG. 4 except that step S13A has been replaced by step S13D, and therefore the process of step S13D will be focused on in the following description. If a positive determination is obtained in step S12, the CPU then reads out the ignition timing corresponding to the alcohol concentration detected in step S12 from the ignition timing map and then executes a process for changing the ignition timing to the timing read out from the ignition timing map (step S13D). That is, the ignition timing is changed based on the fuel property so that the combustion state changes accordingly.

Then, the CPU executes a process for controlling the fuel injection valve 21 so as to inject fuel at a timing close the intake stroke bottom dead center (step S14). Because the ignition timing has already been changed based on the fuel property in step S13D, the fuel injected in step S14 is ignited at the new ignition timing, so that the combustion progresses moderately. This prevents an excessive increase of the combustion speed and thus improves the heat efficiency, whereby homogenous combustion can be performed in a good condition. As such, when intensifying tumble flow using the injected fuel, the ECU 1 of the fourth exemplary embodiment provides a good condition for homogenous combustion by changing the combustion state based on the fuel property.

Fifth Exemplary Embodiment

The structure of the ECU 1 of the fifth exemplary embodiment is the same as that of the ECU 1 of the fourth exemplary embodiment except that the combustion state changing program does not include the ignition timing specified control program of the fourth exemplary embodiment and that the combustion state changing program includes an EGR specified control program that will be described below. Note that the ECU 1 of the fifth exemplary embodiment may also have the ignition timing specified control of the fourth exemplary embodiment. Also, note that the configuration of the internal combustion engine system 100 incorporating the ECU 1 of the fifth exemplary embodiment is the same as that shown in FIG. 9. The EGR specified control program is formulated as follows. During homogenous combustion, the EGR rate (EGR amount/(in-cylinder air amount+EGR amount) corresponding to the detected alcohol concentration is read out from a map data defining the relation between the alcohol concentration and the EGR rate (will be simply referred to as "EGR map"), and the EGR rate is then adjured to the rate read out from the EGR map by controlling the EGR valve 32.

In the case where the internal combustion engine 50 is provided with a variable valve mechanism, the EGR rate specified control program may be formulated so as to adjust the EGR rate to the rate read out from the EGR map by changing the valve overlap amount of the intake valves 55 and the exhaust valves 56 by controlling the variable valve mechanism instead of controlling the EGR valve 32. Also, the EGR rate specified control may be formulated so as to control both of the EGR valve 32 and the variable valve mechanism. Also, instead of the EGR specified control program, a program that increases the ratio of the in-cylinder gas amount to the injected fuel amount may be used as the combustion state changing program.

Figure 12:
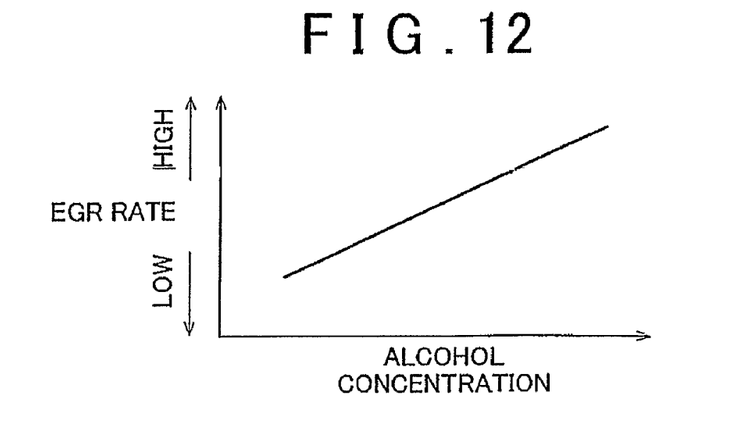
FIG. 12 is a view schematically showing an EGR map data that is stored in the ECU of the fifth exemplary embodiment.

FIG. 12 schematically shows the EGR map defining the relation between the alcohol concentration and the EGR rate. This map is also stored in the ROM in the fifth exemplary embodiment. When the alcohol concentrate is 0% in this map, it indicates that the fuel is normal gasoline. According to the EGR map, in this case, fuel is injected at a timing close the intake stroke bottom dead center, whereby the tumble flow is intensified moderately and homogenous combustion is performed in a good condition with the presently set EGR rate. However, because the stoichiometric air-fuel ratio becomes lower than the stoichiometric air-fuel ratio for gasoline as the alcohol concentration increases, the combustion speed increases excessively during homogenous combustion, and this reduces the heat efficiency. Therefore, the EGR map is formulated such that the EGR rate increases as the alcohol concentration increases. As such, by changing the combustion state, the combustion temperature is reduced, whereby an excessive increase of the combustion speed is prevented. Note that the EGR map is not necessarily formulated to define a linear relation between the alcohol concentration and the EGR rate. In the fifth exemplary embodiment, "combustion state changing means" is provided as the CPU, etc., and the EGR specified control program, and "control apparatus for a direct injection spark ignition internal combustion engine" is provided as the ECU 1.

Figure 13:
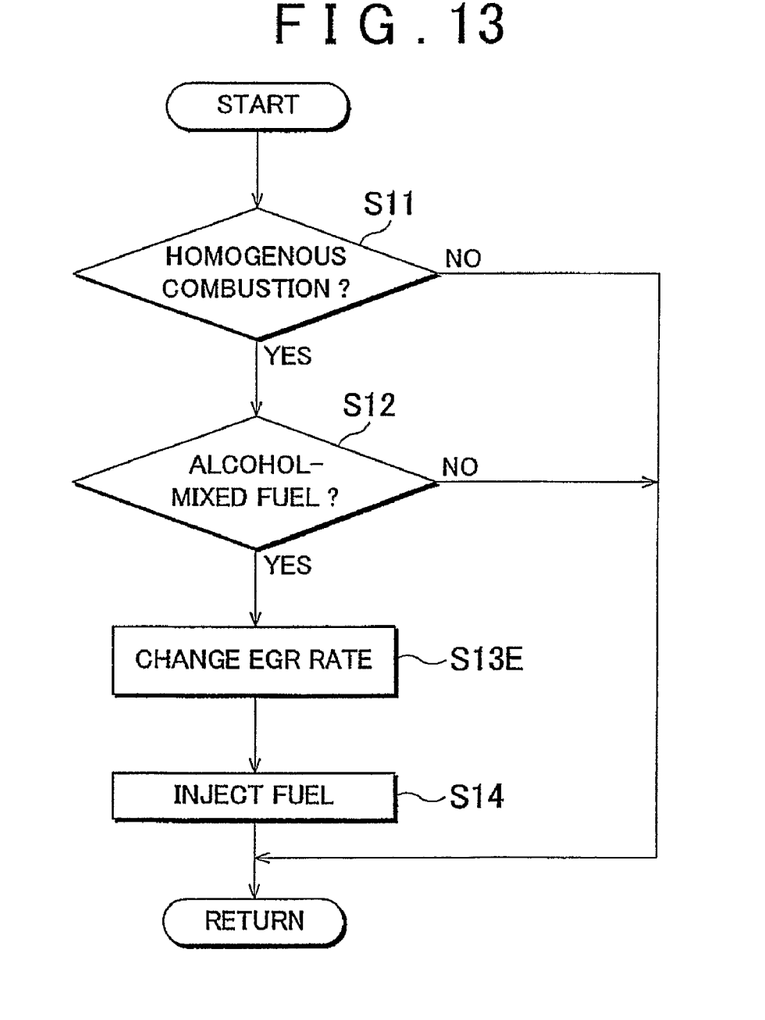
FIG. 13 is a flowchart illustrating the processes that ECU of the fifth exemplary embodiment executes.

Next, a description will be made, with reference to the flowchart in FIG. 13, of the processes that the ECU 1 executes to change the combustion state based on the fuel property. The control routine shown in FIG. 13 is the same as that shown in FIG. 4 except that step S13A has been replaced by step S13E, and therefore the process of step S13E will be focused on in the following description. If a positive determination is obtained in step S12, the CPU then reads out the EGR rate corresponding to the alcohol concentration detected in step S12 from the EGR map and then executes a process for controlling the EGR valve 32 so as to adjust the EGR rate to the rate read out from the ignition timing map (step S13E). That is, the EGR rate is changed based on the fuel property. At this time, if the fuel is alcohol-mixed fuel, because the stoichiometric air-fuel ratio for such alcohol-mixed fuel is lower than that for gasoline, the EGR rate is increased. Next, the CPU executes a process for controlling the fuel injection valve 21 so as to inject fuel at a timing near the intake stroke bottom dead center (step S14). At this time, because the EGR rate has been changed based on the fuel property in step S13E, the combustion temperature of the fuel injected in step S14 is low. This prevents an excessive increase of the combustion speed and thus improves the heat efficiency, whereby homogenous combustion can be performed in a good condition. As such, when intensifying tumble flow using the injected fuel, the ECU 1 of the fifth exemplary embodiment provides a good condition for homogenous combustion by changing the combustion state based on the fuel property.

While the invention has been described with reference to the first to fifth exemplary embodiments, the invention is not limited to these exemplary embodiments, but it may be modified in various forms within the sprit of the invention. In particular, while alcohol-mixed fuels are used in the first to fifth exemplary embodiments, the invention may be applied to various other fuels having different properties from gasoline.

The invention claimed is:

1. A control apparatus in a direct injection spark ignition internal combustion engine including an engine cylinder comprising:
    a fuel property identifying device that identifies a property of a fuel that is injected into the engine cylinder; and
    a combustion state changing device that changes a combustion state based on the property of the fuel,
    wherein the control apparatus creates a tumble flow in the engine cylinder and intensifies the tumble flow by injecting the fuel at a timing near an intake stroke bottom dead center during homogenous combustion,
    wherein the fuel property identifying device identifies the property of the fuel by detecting an alcohol concentration in the fuel,
    wherein the combustion state changing device changes a degree to which the tumble flow is intensified based on the property of the fuel by reducing a thrust force of the fuel as the alcohol concentration detected by the fuel property identifying device increases.

2. The control apparatus according to claim 1, wherein the combustion state changing device reduces the thrust force of the fuel by changing an injection pressure of the fuel.

3. The control apparatus according to claim 1, wherein the combustion state changing device changes the tumble flow intensification degree by changing the injection timing of the fuel.

4. The control apparatus according to claim 1, wherein the combustion state changing device changes the tumble flow intensification degree by changing the injection direction of the fuel.

5. The control apparatus according to claim 4, further comprising a fuel injection valve including at least two injection holes having different injection directions, wherein:
    the combustion state changing device changes the injection direction of the fuel by switching from one of the injection holes to the other of the injection holes.

6. The control apparatus according to claim 3, wherein:
    the fuel property identifying device detects the property of the fuel by detecting the concentration of alcohol in the fuel; and
    the combustion state changing device shifts the injection timing of the fuel farther away from near the intake stroke bottom dead center as the alcohol concentration detected by the fuel property identifying device increases.

7. The control apparatus according to claim 6, wherein the combustion state changing device shifts the injection timing of the fuel away from near the intake stroke bottom dead center by advancing the injection timing from the intake stroke bottom dead center.

8. The control apparatus according to claim 1, wherein the fuel property identifying device is an alcohol concentration sensor that detects the alcohol concentration in the fuel.

9. A method for controlling a direct injection spark ignition internal combustion engine that creates a tumble flow in an engine cylinder and intensifies the tumble flow using fuel injected at a timing near an intake stroke bottom dead center during homogenous combustion, comprising:

identifying an alcohol concentration in the fuel as a property of the fuel; and changing a combustion state based on the property of the fuel identified, wherein a degree to which the tumble flow is intensified by the fuel, is changed by reducing a thrust force of the fuel as the alcohol concentration of the fuel that is identified increases.

10. The method for controlling the direct injection spark ignition internal combustion engine of claim 9, wherein the thrust force of the fuel is reduced by changing an injection pressure of the fuel.

* * * * *